United States Patent
Emerson et al.

(10) Patent No.: US 6,896,628 B2
(45) Date of Patent: May 24, 2005

(54) GOLF BALL COVER MATERIAL—HIGH RESILIENCE

(75) Inventors: Brent D. Emerson, Central, SC (US); George R. Wallace, Clemson, SC (US); Ronald L. Grey, Millboro, DE (US)

(73) Assignee: Dunlop Sports, Westminster, SC (US)

(*) Notice: Subject to any disclaimer, the term of this patent is extended or adjusted under 35 U.S.C. 154(b) by 74 days.

(21) Appl. No.: 09/874,774

(22) Filed: Jun. 5, 2001

(65) Prior Publication Data

US 2002/0049098 A1 Apr. 25, 2002

Related U.S. Application Data

(60) Provisional application No. 60/209,813, filed on Jun. 6, 2000.

(51) Int. Cl.$^7$ ............................................... A63B 37/12
(52) U.S. Cl. ...................................................... 473/378
(58) Field of Search ................................. 473/377, 378, 473/371

(56) References Cited

U.S. PATENT DOCUMENTS

| | | | |
|---|---|---|---|
| 4,884,814 A | * 12/1989 | Sullivan | 473/372 |
| 5,000,459 A | * 3/1991 | Isaac | 260/998.14 |
| 5,120,791 A | * 6/1992 | Sullivan | 473/356 |
| 5,779,562 A | 7/1998 | Melvin et al. | |
| 5,869,578 A | 2/1999 | Rajagoplan | |
| 5,902,855 A | 5/1999 | Sullivan | |
| 6,012,991 A | 1/2000 | Kim et al. | |
| 6,025,442 A | 2/2000 | Harris et al. | |

FOREIGN PATENT DOCUMENTS

| | | |
|---|---|---|
| GB | 2343380 A | 5/2000 |
| WO | WO 98 43709 A | 10/1998 |
| WO | WO 99 08756 A | 2/1999 |
| WO | WO 00 09217 A | 2/2000 |
| WO | WO 00 25868 A | 5/2000 |

OTHER PUBLICATIONS

Curvi, D. European Search Report, Nov. 14, 2001, Whole Document.

* cited by examiner

*Primary Examiner*—Mark S. Graham
*Assistant Examiner*—Raeann Gordon
(74) *Attorney, Agent, or Firm*—Lorusso Loud & Kelly LLP; Jeffrey D. Washville; Marc A. Vivenzio

(57) ABSTRACT

The golf ball comprises all known cores provided with a cover produced by a polymer blend that combines the durability of a conventional cover with excellent feel and playability. The cover formulation is a blend of various ethylene/methacrylic acid copolymers wherein at least one copolymer has a high modulus and at least one copolymer has a moderate modulus forming a miscible blend having a blend that maximizes durability while still maintaining feel and playability.

21 Claims, 1 Drawing Sheet

GOLF BALL COVER MATERIAL— HIGH RESILIENCE

CROSS-REFERENCE TO RELATED APPLICATIONS

A claim of benefit is made to provisional application No. 60/209,813 filed on Jun. 6, 2000, which is herein incorporated by reference.

FIELD OF THE INVENTION

The instant invention is directed to golf balls, and more particularly to a golf ball cover providing improved playability characteristics with respect to hardness, durability and cost without sacrificing superior distance capabilities.

BACKGROUND OF THE INVENTION

There are three main types of golf balls produced by the golfing industry, the "one piece", the "two piece" and the "three piece" ball. The "three piece" ball as the name suggests consists of three basic components: (1) a solid or liquid center section; (2) rubber windings or solid material around the center; (3) and a cover. The "two piece" ball is a newer method for producing a golf ball consisting of a solid core surrounded by a cover. Finally the "one piece" ball is a solid homogenous ball consisting solely of one material. The cover on the "two piece" and "three piece" balls are an important factor in the final properties of the ball.

Until the late 1960's compounds based on natural or synthetic transpolyisoprene covered most golf balls. Additionally, due to the relative softness of the balata cover, skilled golfers are able to impart various spins on the ball in order to control the ball's flight path (e.g. "fade" or "draw") and check characteristics upon landing on a green. Balata-like covers are used predominantly today because of their desirable playing characteristics.

However golf ball manufacturers have been working to replace balata covers for many years because of the many problems associated with the material. While golfers were satisfied with the performance and feel of the balata covers the material is much less durable than the newer synthetic resins. Balata resins are also costly to purchase relative to other cover materials and the labor intensive manufacturing process makes golf balls produced with a balata cover significantly more expensive with a much shorter lifespan than the newer synthetic resins.

The golfing industry addressed the problems associated with ball durability and the costly manufacturing of balata covers by moving to synthetic resins. The vast majority of modern golf balls are covered with a thermoplastic resin such as "Surlyn®", produced by E.I. Dupont De Nemours & Company (see U.S. Pat. No. 4,884,814) or "Escor®" and "Iotek®" produced by Exxon Corporation (see U.S. Pat. No. 4,911,451). These resins are ionomeric polymers that undergo ionic bonding between their polymer chains to produce a material that is very durable.

Ionomeric resins are polymers containing interchain ionic bonding. As is well known in the chemical arts, ionomeric resins are copolymers made from an olefin containing two to eight carbon atoms, typically ethylene and the metal salt of an unsaturated carboxylic acid. Typical unsaturated carboxylic acids are acrylic acid, methacrylic acid or maelic acid. The copolymer then has a certain percentage of its acidic groups neutralized by a metal ion such as magnesium, sodium, zinc or lithium to produce a synthetic cover with the durability desired. The pendent ionic groups in the ionomeric resins interact to form ion-rich aggregates contained in a non-polar polymer matrix. The shortfall of these durable synthetic covers is that the materials can be very hard and the playability of the ball is decreased. The "hardness" of a golf ball can affect the "feel" of a ball and the sound or "click" produced at contact. "Feel" is determined as the deformation (i.e. compression) of the ball under various load conditions applied across the ball's diameter. Generally, the lower the compression value, the softer the "feel."

To address the problem of hardness the golfing industry then attempted to soften the synthetic covers by blending hard ionomeric covers with the desired durability with those of a softer polymer such as a polyurethane. Unfortunately the blending of the hard ionomeric polymers with a softer polymer was difficult to process and the resulting ball cover proved to have inadequate distance capability and reduced durability.

Other attempts at blending the hard ionmeric polymer and a softer polymer were addressed in U.S. Pat. No. 4,884,814. The '814 patent blended a "hard" methacrylic acid based ionomeric resin with a softer methacrylic acid based ionomeric resin. The hard resin measured 60 to 66 and the soft resin measured 25 to 40 on the Shore D scale when measured in accordance with ASTM method D-2240. While processability of this blend was significantly better it also suffered from decreased distance.

In an attempt to overcome the negative factors of the hard ionomer covers, DuPont introduced low modulus SURLYN ionomers in the early 1980's. These SURLYN ionomers have a flexural modulus of from about 3000 to about 7000 PSI and hardness of from 25 to about 40 as measured on the Shore D scale—ASTM 2240. The low modulus ionomers are terpolymers, typically of ethylene, methacrylic acid and nB or iso-butylacrylate, neutralized with sodium, zinc, magnesium or lithium cations. E.I. DuPont De Nemours & Company has disclosed that the low modulus ionomers can be blended with other grades of previously commercialized ionomers of high flexural modulus from about 30,000 to 55,000 PSI to produce balata-like properties. However, soft blends, typically 52 Shore D and lower (balata-like hardness), are still prone to cut and shear (abrasion) damage.

The low modulus ionomers when used without high flexural modulus blends produce covers with very similar physical properties to those of balata, including poor cut and shear resistance. Worse, wound balls with these covers tend to go "out-of-round" quicker than wound balls with balata covers. Blending with hard SURLYN ionomers was found to improve these properties.

The primary properties associated with golf ball performance are resilience and hardness. The coefficient of restitution (C.O.R.), which is defined as the ratio of the relative velocity of the sphere before and after direct impact is used to determine the resilience of a golf ball. The C.O.R. is measured on a scale of zero to one, with one being a perfectly elastic collision and zero an inelastic collision.

The C.O.R. of a golf ball is a function of the properties of its core and cover combination. The golf ball with a higher measured C.O.R. performs better than other golf balls with a lower measured value. Materials with a C.O.R. of 0.700 and above are useful as a cover material. Materials with a C.O.R. of 0.715 at initial velocity of its flight are considered to have superior performance as a golf cover.

OBJECT OF THE INVENTION

Accordingly, it is an object of the instant invention to provide a golf ball cover that has improved resilience capabilities.

It is another object of the instant invention to optimize the hardness of the golf ball cover.

It is yet another object of the instant invention to provide a golf ball having a synthetic cover material that achieves the sound, feel, playability and flight performance qualities of balata covered golf balls.

An additional object is to provide a golf ball cover with improved durability over previous covers.

It is a further object of the instant invention to lower the cost of manufacturing a golf ball cover that has a soft feel in combination with superior distance capabilities.

It is a further object of the instant invention to create a golf cover that is easy to process.

SUMMARY OF THE INVENTION

The present invention achieves the above-described objectives by providing a golf ball cover having the desired properties similar to traditional "balata" covers with the desired durability and ease of processing associated with that of a hard ionomeric resin producing a ball that will travel the greatest distance without compromising shot-making feel.

The cover produces a golf ball that possesses noticeable improvements in playability (i.e. spin properties) without sacrificing the ball's durability (i.e. impact resistance etc.), which in turn relates directly to the distance a ball will travel when struck. These and other objects of the instant invention will be apparent from a reading of the following detailed description of the instant invention.

DETAILED DESCRIPTION OF THE INVENTION

Figure 1:
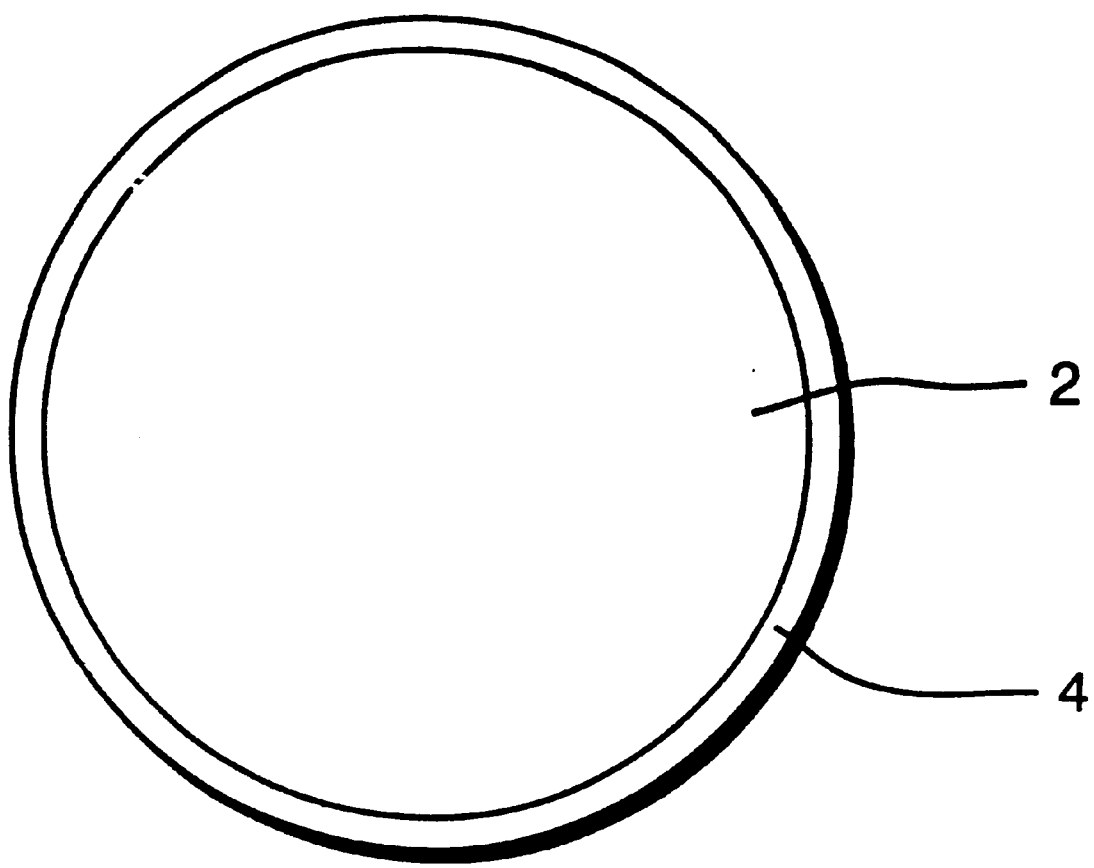
FIG. 1 is a sectional view of a golf ball made in accordance with one embodiment of the invention.

FIG. 1 shows a cross sectional view of a golf ball cover made according to the present invention. The core 2 is any conventional material that when used in conjunction with cover 4 that has the desired properties of a superior golf ball. The cover of the instant invention is compatible with any two-piece rubber core, three piece wound core or any other core known to the golfing industry that provides the necessary compression for playability or feel. Ideally the core and cover combination should have a C.O.R. greater than 0.700.

Once formed, the core 2 is then subjected to a conventional molding process whereby the SURLYN cover 4 is injection molded, compression molded or any other suitable method for forming the cover around the core 2 in a manner well known to those skilled in the art. To make the cover, the blended components of the cover are injection or compression molded into cavities, which contain cores suspended in the center of the cavities. The inner surfaces of the cavities are constructed with dimple-shaped projections, which form the dimples in the cover. The process used to make the cover is the standard process used and well known in the art wherein one or more components are added together to form a blend which is then injected or compressed into the mold. After molding, the golf balls produced may undergo further processing steps such as pressure blasting, vibratory finishing, stamping of the logo, application of a primer, and finally, application of a top coat.

In the preferred embodiment, the cover has a thickness of about 0.060" to 0.090" leading to provide a total diameter of core and cover equal to or greater than 1.680", the commercial ball diameter standard specified by the United States Golf Association.

The present invention relates to improved cover formulations for golf balls. It has been discovered that the blending of copolymers one or more of which may be an ionomer (such as ethylene-methacrylic acid, ethylene-acrylic copolymers or any other olefin-unsaturated carboxylic acid copolymer having similar properties wherein the acid level of the blend is 12–19% by total weight of the copolymer) having a moderately high modulus (45,000 to 60,000 PSI) with that of a moderately low modulus (10,000 to 14,000 PSI), wherein the acid groups of the ionic polymers are then partially neutralized by sodium, zinc, magnesium, or lithium either alone or in any combination of the aforementioned ions results in a cover which has greater durability than prior art balls with a reduced hardness. Therefore the playability of the ball is increased over prior art attempts at ionic polymer blends.

The cover material of the instant invention can be produced from the blends of various grades of resins formed from the copolymerization of an olefin and an unsaturated carboxylic acid wherein at least one polymer is partially neutralized by a metal ion. A typical effective example of a copolymer of this invention is the copolymer of ethylene and unsaturated methacrylic acid. The invention is a blend of synthetic thermoplastic ionomeric resins produced by blending a moderately high modulus ionomeric (MHMI) polymer with a moderately low modulus polymer (MLMP). The average acid level of the final blend would be within the range of 12–19% by weight of acid. One or more of the copolymer blends of the instant invention are neutralized by a metal ion. The typical metal ions are lithium, magnesium, sodium or zinc. An example of typical polymers that can be used in the cover composition that are commercially available and are sold by E.I. Dupont De Nemours & Company under the trademarks SURLYN and NUCREL.

As used herein, the term moderately high modulus ionomer (MHMI) shall be defined as a copolymer consisting of approximately 80–90%, preferably 83–87% by weight of ethylene or other similarly performing olefin, of approximately 10–20%, preferably 13–17% by weight of methacrylic acid or other similarly performing unsaturated carboxylic acid, where 10–90% of the acid groups are neutralized by sodium, zinc, magnesium or lithium ions. The MHMI will preferably have a melt index of 0.5 to 1.0 g/10 min. but may range from 0.5 to 7.0 g/10 min, Shore D hardness of 55–75 Shore D but preferably 60–70, and a flexural modulus preferably between 45,000–55,000 PSI but it may range from 30,000 to 75,000 PSI.

As used herein, the term moderately low modulus polymer (MLMP) shall be defined as a copolymer consisting preferably of approximately 79–83% by weight of ethylene or a similarly performing olefin but a range of 70% to 90% is acceptable, preferably 13–17% by weight of methacrylic acid or similar performing unsaturated carboxylic acid but a range of 10–21% by weight is acceptable. The MLMP will preferably have a melt index of 20 to 30 g/10 min. but a range of 10 to 65 g/10 minutes is acceptable, Shore D hardness of preferably 57–67 but an acceptable range is 45–67, and a flexural modulus preferably between 10,000–14,000 PSI but a range of 5,000 to 25,000 PSI is acceptable.

The methods for preparing the aforementioned polymers and ionomers are well known in the art and are described in U.S. Pat. No. 4,351,931 to Armitage assigned to E.I. Du Pont de Nemours that is herein incorporated by reference. The method for preparation of high acid copolymers is a complicated process due to phase separation of the monomer-solvent phase. The method for producing a high acid copolymer is described in U.S. Pat. No. 4,351,931 to Armitage is also incorporated through reference herein. Once the ionic polymers have been produced the instant invention can be produced using any known conventional method of blending the copolymers.

A well know method in the art of blending polymers is through the use of a conventional extruder. The polymers can be melt blended in a temperature range of 175° to 220° C. and processed conventionally. The material is not excessively shear sensitive so any amount which results in sufficient mixing is acceptable. Once the cover material is sufficiently blended the golf ball can be produced by any known method. A conventional method of producing ionmer blend golf ball covers is described in U.S. Pat. No. 5,000,459 to Issac assigned to Acushnet, that is herein incorporated by reference.

Additionally compatible additives may be added to the cover blend of the instant invention. Examples of common additives are dyes and colorants such as titanium dioxide, zinc oxide, zinc sulfate and fluorescent pigments. As shown by U.S. Pat. No. 4,884,814 to Sullivan, assigned to Spalding, the loading of pigment or dye into a polymeric cover is dependant upon the base polymer utilized and the desired colorant to be added to the polymer. The final amount of colorant is dependent on the exact polymer blend and should be adjusted accordingly. The ideal loading level for colorant usually falls in the range of about 5% of the total weight of the cover.

Suitable for the present invention the cover blend composition will include 80–55% by weight of at least one MHMI polymers consisting of preferably approximately 83–87% by weight of ethylene or a similarly performing olefin but a range of 80–90% is acceptable, preferably 13–17% by weight of methacrylic acid or similar performing unsaturated carboxylic acid but 10–20% is acceptable, where 10–90% of the acid groups are neutralized by sodium, zinc, magnesium or lithium ions and will preferably have a melt index of 0.5 to 1.0 g/10 min. but a range of 0.5 to 7.0 g/10 min. is an acceptable range, Shore D hardness preferably of 60–70 but a range of 55–75 is acceptable, and a flexural modulus preferably between 45,000–55,000 PSI but an acceptable range is 30,000 to 75,000 PSI, and 20–45% by weight of at least one MLMP polymer preferably consisting of approximately 79–83% by weight of ethylene or a similarly performing olefin but an acceptable range is 70 to 90%, preferably 13–17% by weight of methacrylic acid or similar performing unsaturated carboxylic acid but a range of 10–21% is acceptable and having preferably a melt index of 20 to 30 g/10 min. but an acceptable range is 10 to 65 g/10 min., Shore D hardness preferably of 57–67 but an acceptable range is 45–67, and a flexural modulus preferably between 10,000–14,000 PSI but an acceptable range being 5,000 to 25,000 PSI with the resulting final acid level preferably between 13–17% by weight of acid but an acceptable range is 10–21%. There are many commercial grades available which would satisfy these requirements of the instant invention.

In a preferred embodiment a blend of polymers with at least one polymer of a moderate modulus (10,000 to 14,000 PSI) and a medium acid level having a Shore D of approximately 63, combined with at least one additional ionomeric copolymer having a high modulus (45,000 to 55,000 PSI), and medium acid level with a Shore D of approximately 65 being partially neutralized by either sodium or zinc produces a cover with superior characteristics. This blend results in a golf ball cover with improved playability characteristics.

In another preferred embodiment the cover is a polymer blend of three copolymers with at least one of the polymers an ionic copolymers. The first component of the polymer blend consists of an ethylene/methacrylic acid copolymer with an acid level of 15% by weight wherein it is 20–45% by weight of the total blend, preferably 20 to 30%, and most preferably 25% by weight. The second component of the polymer blend consists of ethylene/methacrylic acid copolymer with an acid level of 15% neutralized by zinc ions wherein it is up to 50% by weight of the total blend, preferably 20 to 40%, and most preferably 30% by weight. The third component of the polymer blend consists of ethylene/methacrylic acid copolymer with an acid level of 15% neutralized by sodium ions wherein it is 10–90% by weight of the total blend, preferably 25 to 60%, and most preferably 45% by weight.

For the purposes of illustration the DUPONT ionomer resin grade designations for an ionomer define a low acid level is approximately 12% by weight, a medium acid level is approximately 15% by weight and a high acid level is approximately 19% by weight.

In a preferred embodiment composed of commercially available polymers from DUPONT, for illustrative purposes only is the following; the polymer blend is 45% by weight of SURLYN 8920 or SURLYN 8945, 30% by weight of SURLYN 9910 and 25% by weight of NUCREL 925. As discussed previously, the cover material is comprised of ionomer resins and polymers available from E. I. du Pont de Nemours & Co. under the name SURLYN and NUCREL. The hardness of the cover produced by this blend formulation is about 64±3 Shore D.

In the aforementioned illustrative cover formulation SURLYN 8920 or SURLYN 8945 can comprise from 10 to 90% by weight, SURLYN 9910 can comprise from 0 to 50% by weight and NUCREL can comprise 20 to 45% by weight of the total formulation. The invention is not limited to these commercial grades but other similar grades may be substituted.

It will be appreciated that the instant specification and claims are set forth by way of illustration and do not depart from the spirit and scope of the instant invention. It is to be understood that the instant invention is by no means limited to the particular embodiments herein disclosed, but also comprises any modifications or equivalents within the scope of the claims.

We claim:

1. A golf ball comprising:
   a core;
   a cover comprising a blend of an ionomeric polymer of at least one moderately high modulus ionomer; and, at least one moderately low modulus polymer having a Shore D hardness of about 45–67, wherein said blend comprises about 20 to 45% by weight of said moderately low modulus polymer and said blend is disposed over said core, wherein the moderately high modulus ionomer is a copolymer consisting of approximately 80–90% by weight of an olefin, 10–20% by weight of unsaturated carboxylic acid wherein 10–90% of an acid groups formed are neutralized by an ion donor, wherein the olefin of the moderately high modulus ionomer is ethylene, wherein the unsaturated carboxylic acid is methacrylic acid and the acid groups are neutralized by the ion donor selected from the group consisting of sodium, zinc, magnesium and lithium ions or mixtures thereof, and wherein said moderately high modulus ionomer has a melt index of 0.5 to 1.0 grams/10 minutes, a flexural modulus of about 30,000 to 75,000 PSI, and a shore D hardness of about 55–75;

wherein the moderately low modulus polymer comprises approximately 79–90% by weight of an olefin, 10–21% by weight of unsaturated carboxylic acid, wherein said moderately low modulus polymer is ethylene, wherein said unsaturated carboxylic acid is methacrylic acid and has a melt index of 10 to 65 grams/10 minutes, a flexural modulus of about 10,000 to 14,000 PSI.

2. A golf ball comprising:

a core;

a cover comprising an ionmomeric polymer blend which comprises:
   at least one moderately high modulus ionomer (MHMI) wherein said MHMT is a copolymer comprising 80–90% by weight of ethylene, 10–20% by weight of methacrylic acid, wherein said MHMI is neutralized by an ion selected from the group consisting of sodium, zinc, magnesium or lithium and,
   at least one moderately low modulus polymer (MLMP) comprising about 20 to 45% by weight of said blend wherein said MLMP is a copolymer comprising 80–90% by weight of ethylene, 10–20% by weight of methacrylic acid, wherein said MLMP is neutralized by an ion selected from the group consisting of sodium, zinc, magnesium or lithium and said MLMP has a flexural modulus of about 10,000 to 14,000 PSI;

wherein said cover is disposed over said core.

3. The golf ball of claim 2 wherein said MHMI has a melt index of 0.5 to 7.0 grams/10 minutes, a Shore D hardness of 55–75, and a flexural modulus of about 30,000 to 75,000 PSI.

4. The golf ball of claim 2 wherein the MLMP has a melt index of 10 to 65 grams/10 minutes, a shore D hardness of 45–67.

5. The golf ball of claim 2 further comprising:
   a third polymer component blended with said MHMI and said MLMP, wherein said third polymer component comprises about 25% to 60% by weight of said blend wherein said third polymer component is an ethylene/methacrylic acid copolymer with an acid level of about 15%.

6. The golf ball of claim 5 wherein said MHMI comprises about 80 to 55% by weight of said blend.

7. The golf ball of claim 5 wherein said MHMI has a Shore D hardness of 55–75.

8. The golf ball of claim 5 wherein said MHMI has a flexural modulus of 30,000 to 75,000 PSI.

9. The golf ball of claim 5 wherein said MLMP has a Shore D hardness of 45–67.

10. The golf ball of claim 2 further comprising an additional polymer having a modulus of about 45,000 to 55,000 PSI blended with said MHMI and said MLMP.

11. A golf ball comprising:

a core;

a cover wherein said cover is a polymer blend comprising:
   a first blend polymer having a melt index of 0.5 to 7.0 g/10 minutes, Shore D hardness of 55–75, and a flexural modulus of about 30,000 to 75,000 PSI; and,
   at least one additional blend polymer comprising about 20% to 45% of said polymer blend wherein said additional blend polymer is completely miscible with said first blend polymer, has a melt index of 10 to 65 g/10 minutes, Shore D hardness of 45 to 67, a flexural modulus of about 10,000 to 14,000 PSI forming a cover which is disposed upon said core.

12. The golf ball of claim 11 wherein said first blend polymer is an ethylene/methacrylic acid copolymer having a 15% by weight acid level partially neutralized by sodium ions comprising 10% to 90% by weight of said blend;
   wherein at least one said additional blend polymer is an ethylene/methacrylic acid copolymer having a 15% by weight acid level partially neutralized by zinc ions comprising 0 to 50% by weight of said blend; and, further comprising a third ethylene/methacrylic acid copolymer having a 15% by weight acid.

13. The golf ball according to claim 12 wherein said first blend polymer is 25% to 65% by weight, said additional polymer is 20% to 40% by weight and said third copolymer is 25% to 35% by weight.

14. The golf ball according to claim 13 wherein said first blend polymer is about 45% by weight, said additional polymer is about 30% by weight and said third copolymer is about 25% by weight.

15. The golf ball of claim 13 wherein said cover has a Shore D of about 61 to 67.

16. The golf ball of claim 11 wherein the cover has a thickness of about 0.06 to 0.09 inches.

17. A golf ball having a core and a cover surrounding said core, said cover including an ionomeric polymer blend comprising:

a moderately high modulus polymer, and at least one moderately low modulus polymer having a Shore D hardness of between about 45 to 67, and being about 20% to 45% by weight of said ionomeric polymer blend, wherein said moderately low modulus polymer has a flexural modulus of about 10,000 to 14,000 PSI.

18. A golf ball cover material comprising:

a blend of polymers wherein at least one polymer is an ionic copolymer comprising:
   a first polymer component comprising about 20% to 45% of said blend by weight, wherein said first polymer component is an ethylene/in ethacrylic acid copolymer having a flexural modulus of 10,000 to 14,000 PSI;
   a second polymer component comprising about 0 to 50% of said blend by weight wherein said second polymer component is an ethylene/methacrylic acid copolymer; and,
   a third polymer component comprising about 25% to 60% by weight of said blend wherein said third polymer component is an ethylene/methacrylic acid copolymer.

19. The golf ball cover material of claim 18 wherein said second polymer component has an acid level of about 15%.

20. The golf ball cover material of claim 18 wherein said third polymer component has an acid level of about 15%.

21. The golf ball cover material of claim 18 wherein said blend of polymers has a Shore D of about 61 to 67.

* * * * *